United States Patent
Yoon et al.

(10) Patent No.: US 10,479,192 B2
(45) Date of Patent: Nov. 19, 2019

(54) VEHICLE RADIATOR HAVING TWO DIFFERENT COLORS

(71) Applicants: Hyundai Motor Company, Seoul (KR); Kia Motors Corporation, Seoul (KR); Plakor Co., Ltd., Hwaseong, Gyeonggi-do (KR)

(72) Inventors: Jin Young Yoon, Gyeonggi-do (KR); Hyun Gyung Kim, Gyeonggi-do (KR); Dong Eun Cha, Gyeonggi-do (KR); Ki Hong Lee, Seoul (KR); Han Mo Kang, Seoul (KR); Seung Hyeok Chang, Gyeonggi-do (KR); Jeong Du Noh, Gyeonggi-do (KR); Yong Whan Lee, Gyeonggi-do (KR); Youn Woo Park, Gyeonggi-do (KR); Seok Heon Yoon, Gyeonggi-do (KR)

(73) Assignees: Hyundai Motor Company, Seoul (KR); Kia Motors Corporation, Seoul (KR); Plakor Co., Ltd., Gyeonggi-do (KR)

( * ) Notice: Subject to any disclaimer, the term of this patent is extended or adjusted under 35 U.S.C. 154(b) by 40 days.

(21) Appl. No.: 15/831,039

(22) Filed: Dec. 4, 2017

(65) Prior Publication Data
US 2019/0077250 A1 Mar. 14, 2019

(30) Foreign Application Priority Data
Sep. 11, 2017 (KR) .......................... 10-2017-0115615

(51) Int. Cl.
B60K 11/00 (2006.01)
B60K 11/08 (2006.01)
B60K 11/02 (2006.01)

(52) U.S. Cl.
CPC .............. *B60K 11/08* (2013.01); *B60K 11/02* (2013.01)

(58) Field of Classification Search
CPC ................................ B60K 11/08; B60K 11/02
See application file for complete search history.

(56) References Cited

U.S. PATENT DOCUMENTS 2,566,605 A * 9/1951 Ekornaas ................ B60R 19/52
293/115
4,011,192 A * 3/1977 Lees ..................... B29C 47/046
523/303

(Continued)

FOREIGN PATENT DOCUMENTS

KR    20090063159 A    6/2009

*Primary Examiner* — Hau V Phan
(74) *Attorney, Agent, or Firm* — Mintz Levin Cohn Ferris Glovsky and Popeo, P.C.; Peter F. Corless

(57) ABSTRACT

A vehicle radiator grill that is manufactured by integrally combining plastic resins of different colors by using double injection and thus has two different colors is provided. The vehicle radiator grill includes a base component that has a first color and forms an exterior of a radiator grill while providing a vent component which has a plurality of air passages formed therethrough and blocked parts are disposed at both sides of the vent component. Additionally, an image component which has a second color different from the color of the base component is integrally formed with the base component by using double injection and exposes the second color toward the front of the radiator grill through the air passage to form an image of two different colors.

7 Claims, 14 Drawing Sheets

(56) References Cited

U.S. PATENT DOCUMENTS

| | | | | |
|---|---|---|---|---|
| 4,315,724 | A * | 2/1982 | Taoka | B29C 45/16 264/245 |
| 5,277,950 | A * | 1/1994 | Zoller | B29C 39/10 264/237 |
| 5,399,393 | A * | 3/1995 | Zoller | B29C 39/10 293/128 |
| 6,328,358 | B1 * | 12/2001 | Berweiler | B60R 19/52 180/68.6 |
| 6,659,220 | B2 * | 12/2003 | Kobayashi | B60K 11/08 180/68.1 |
| 7,481,487 | B2 * | 1/2009 | Lau | B60R 19/52 180/68.1 |
| 9,401,763 | B2 * | 7/2016 | Cregg | H05B 37/0272 |
| 2002/0096378 | A1 * | 7/2002 | Kobayashi | B60K 11/08 180/68.6 |
| 2007/0153033 | A1 * | 7/2007 | Wu | H05K 3/125 347/8 |
| 2010/0015434 | A1 * | 1/2010 | Iwata | C08G 18/6216 428/327 |
| 2011/0047784 | A1 * | 3/2011 | Ohtake | H01Q 1/42 29/600 |
| 2016/0096425 | A1 * | 4/2016 | Walters | B60K 11/085 180/68.1 |
| 2016/0101567 | A1 * | 4/2016 | Van Liew | B33Y 10/00 264/245 |

\* cited by examiner

FIG. 13A
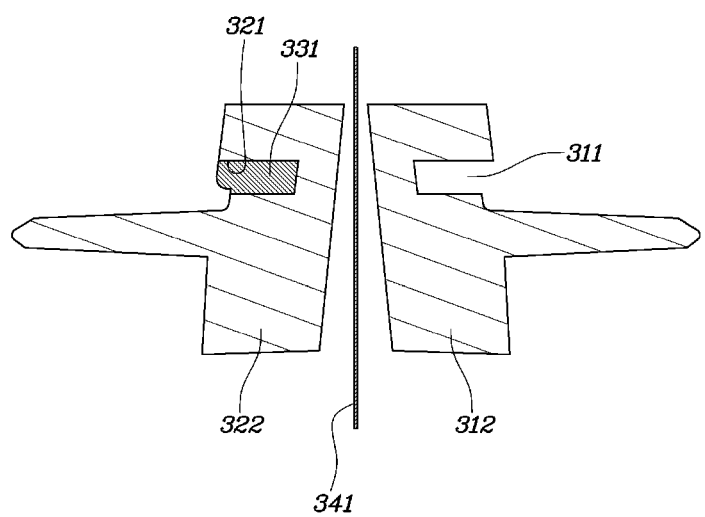
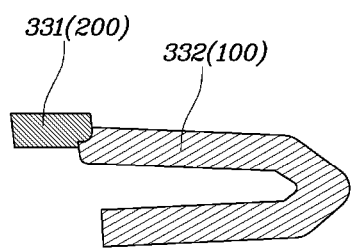
FIG. 13B

VEHICLE RADIATOR HAVING TWO DIFFERENT COLORS

CROSS REFERENCE TO RELATED APPLICATION

The present application claims priority to Korean Patent Application No. 10-2017-0115615, filed Sep. 11, 2017, the entire contents of which is incorporated herein for all purposes by this reference.

BACKGROUND

1. Field of the Disclosure

The present disclosure relates a vehicle radiator grill, and more particularly, to a vehicle radiator grill having two different colors integrally formed using double injection.

2. Description of the Prior Art

Generally, various heat exchangers, such as a radiator, an intercooler, an evaporator, and a condenser, as well as components for driving, a vehicle such as an engine are disposed within an engine compartment of a vehicle. In the heat exchangers described above, a heat exchange medium circulates, and the heat exchange medium within the heat exchanger and air outside the heat exchanger exchange heat with each other to cool down an engine compartment or dissipate heat in an engine compartment, thus an external air is requited to be steadily supplied to the interior of an engine compartment to provide stable operation of various heat exchangers in a vehicle engine compartment. In particular, a radiator grill operating as a ventilation opening is mounted in front of a radiator. A radiator grill is arranged on the front surface of a vehicle and provides a visual exterior image of the vehicle. Accordingly, the use of a vehicle radiator grill having two different colors is gradually increasing to respond to consumer demands.

Typically, methods of producing a radiator grill having two different colors include partially painting or plating a different color on a surface of a radiator grill manufactured in a single color, dividing the radiator grill into two differently-colored hardware components, separately manufacturing the two differently-colored hardware components, and then assembling the two differently-colored hardware components using a separate fastening component such as a screw; and the like. However, painting or plating and assembling the two hardware components using a separate fastening component increase the weight and the cost due to the additional components. Accordingly, productivity decreases due to the increased number of processes. The above description in this section is merely for improving understanding of the background of the present disclosure, and should not be taken as an acknowledgement indicating that the information forms a prior art that is already known to a person skilled in the art.

SUMMARY

The present disclosure provides a vehicle radiator grill manufactured by integrally combining plastic resins of different colors using double injection and has two different colors to improve productivity through reduction in weight, cost, and the number of processes. Additionally, the present disclosure has environmentally friendly characteristics, which are harmless to the human body by incorporating two different colors without painting or plating. The size of air passage formed through the radiator grill may be enlarged while incorporating two different colors to provide a greater radiator cooling area. The same amount of external exposure of the engine compartment through the air passage as that of the conventional art may be maintained even when the size of the air passage is widened to secure a cooling area of a radiator, and the exterior aesthetics may be maintained by prevention of expansion of the air passage.

In accordance an aspect of the present disclosure, a vehicle radiator grill having two different colors may include a base component having a first color, the base component forming an exterior of a radiator grill while providing a vent component having a plurality of air passages formed therethrough and blocked portions disposed at both sides of the vent component and an image component that has a second color, which is different from the color of the base component, and is integrally formed with the base component using double injection. Additionally, the second color disposed toward the front of the radiator grill may be exposed through the air passage to form an image of two different colors.

In some exemplary embodiments, the image component coupled to the vent component of the base component may include a cross-coupling component that is coupled to the rear surface of the base component along a lower edge of the air passage, partially protrude toward the air passage, and exposed toward the front of a radiator grill to form an image of two different colors and a longitudinal-coupling component that is coupled to the rear surface of the base component to connect the cross-coupling component in the vertical direction and strengthens the coupling force between the base component and the cross-coupling component. A stepped seating surface may be formed in a stair-like shape on a lower edge of the air passage, and a front end component of the cross-coupling component may be more stably seated in and coupled to the seating surface to overlap the seating surface.

In other exemplary embodiments, a lower component of the cross-coupling component having about 30% to 40% thickness of the clubs-sectional thickness of the cross-coupling component may be seated on and coupled to the seating surface of a lower edge of the air passage to overlap the seating surface, and an upper component of the cross-coupling component having the remaining thickness of about 60% to 70% protrudes toward the air passage and is exposed toward the front of a radiator grill to form an image of two different colors.

Additionally, an upper surface of the cross-coupling component may be formed to have the front side disposed at a higher position than the rear side and may be formed as a sloped surface gradually descending from the front to the rear. A lower surface of the cross-coupling component may be formed to have the front side disposed at a lower position than the rear side and may be formed as a sloped surface gradually ascending from the front to the rear. The antero-posterior length of the upper surface of the cross-coupling component may be a length of about 5 to 7 times the clubs-sectional height of the cross-coupling component protruding toward the air passage.

In some exemplary embodiments, the longitudinal-coupling component may include a protrusion component coupled to fill an insertion aperture formed in the base component and a body component formed to have a size capable of blocking the exterior side of the insertion aperture and may be patched and coupled to the rear surface of the base component. A clubs sectional thickness of the base component on a region coupled to the protrusion component may be formed to have a thickness of about 40% to 60% with respect to a clubs sectional thickness of the body component protruding to the exterior side of the protrusion component from the region where the protrusion component and the body component are coupled together.

In other exemplary embodiments, the image component coupled to a blocked component of the base component may include a plane component that is coupled to the cross-coupling component to strengthen the coupling force of the clubs-coupling component and overlappingly coupled in a patched form to the rear surface of the base component.

BRIEF DESCRIPTION OF THE DRAWINGS

The above and other aspects, features and advantages of the present disclosure will be more apparent from the following detailed description taken in conjunction with the accompanying drawings, in which:

FIGS. 7 to 14 are exemplary views for illustrating a process of manufacturing a vehicle radiator grill having two different colors by using a spin form method of double injection according to an exemplary embodiment of the present disclosure.

DETAILED DESCRIPTION

Figure 1:
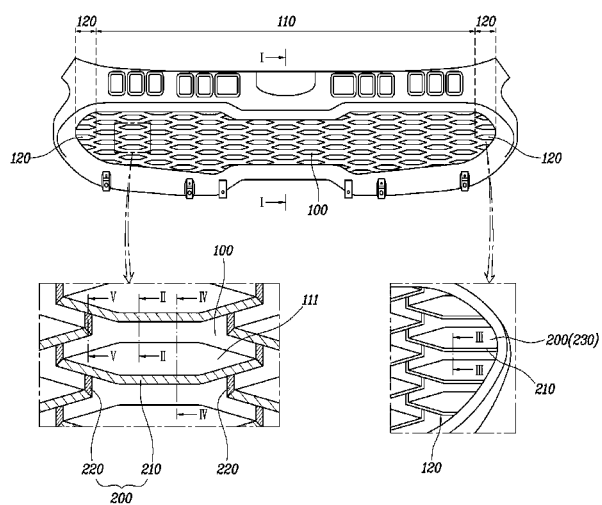
FIG. 1 is an exemplary view of a vehicle radiator grill having two different colors according to an exemplary embodiment of the present disclosure, illustrating a view from the rear of the radiator grill.
Figure 2:
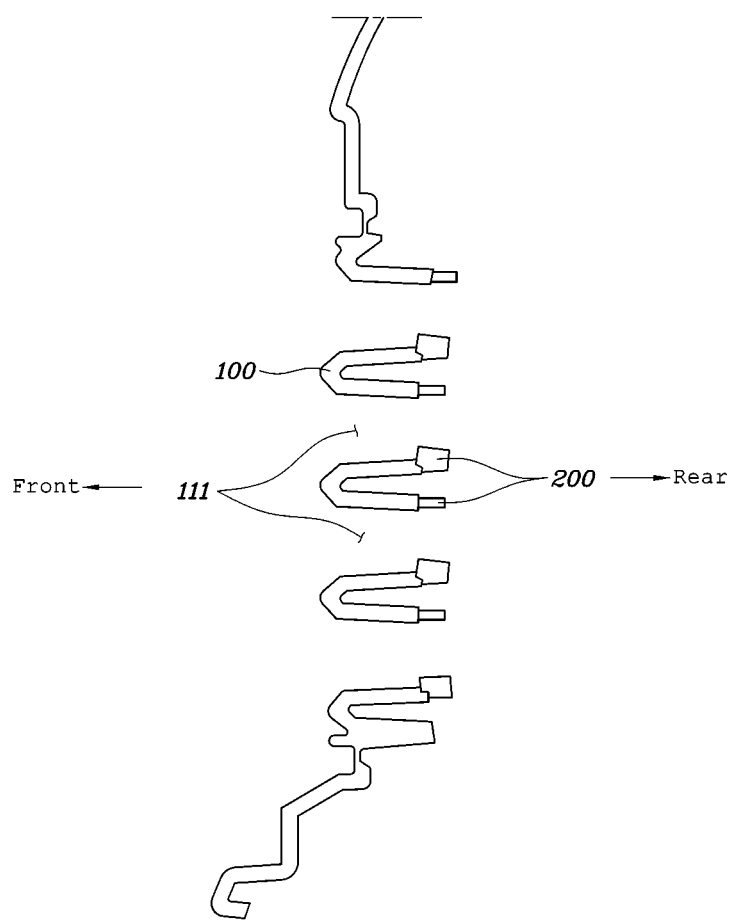
FIG. 2 is an exemplary sectional view taken along the line I-I in FIG. 1 according to an exemplary embodiment of the present disclosure.
Figure 3:
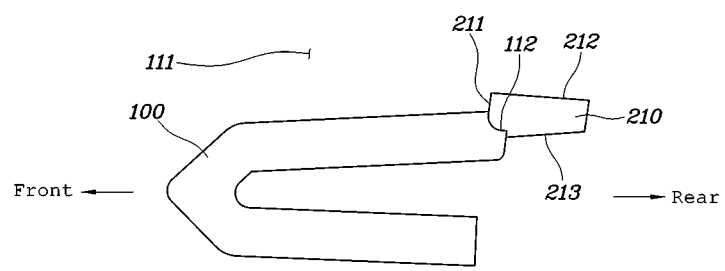
FIGS. 3 to 6 are exemplary sectional views taken along lines II-II to V-V in FIG. 1 according to an exemplary embodiment of the present disclosure.
Figure 4:
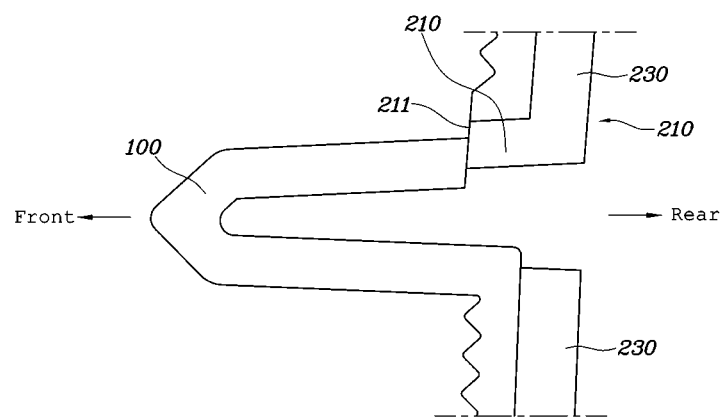

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a vehicle radiator having two different colors according to an exemplary embodiment of the present disclosure will be described with reference to the accompanying drawings. As illustrated in FIGS. 1 to 6, a vehicle radiator grill having two different colors according to an exemplary embodiment of the present disclosure may include a base component 100 having a first color, the base component 100 forming an entire exterior of a radiator grill while providing a vent component 110 having a plurality of air passages 111 formed therethrough and blocked parts 120 disposed at both sides of the vent component 110 and an image component 200 that has a second color, which is different from the color of the base component 100, integrally formed with the base component 100 using double injection, and exposes the second color toward the hunt of the radiator grill through the air passage 111 to form an image of two different colors.

The base component 100 may be an Acrylic Styrene Acrylonitrile (ASA) resin and black color, and the image component 200 may be a mixed resin of Poly Carbonate (PC) and Acrylonitrile Butadiene Styrene (ABS) and red color, but the present disclosure is not limited thereto. According to the present disclosure, the base component 100 and the image component 200 may have two different colors from each other and may be manufactured by double injection thereby having an integrally formed structure.

Conventionally, a radiator grill of two different colors has been realized by partially painting or plating a different color on a surface of a radiator grill manufactured in a specific color and thus has drawbacks such as an increase in the number of processes, a decrease in productivity and the like caused by painting or plating. In particular, the painting or plating process is harmful to the human body. However, the present disclosure provides a base component 100 and an image component 200 which have different colors from each other and may be integrally formed through double injection to form a radiator grill having two different colors. Accordingly, the present disclosure may reduce the number of processes, improve productivity and be environmentally friendly.

Additionally, in conventional method, a radiator grill is divided into two differently-colored hardware components.

The two differently-colored hardware components are manufactured separately and then assembled using a separate fastening component such as a screw or a hook. When being assembled using a screw or a hook as described above, the two components have a gap formed therebetween. The gap gradually increases by airflow having a significant pressure and a whistle noise occurs due to the airflow passing through the gap, and the fastening force of the two components is reduced. Therefore, the component corresponding to the image component vibrates with respect to the component corresponding to the base component and an area of the component is increased. The aerodynamic force deteriorates due to an increased resistance caused by the increased area of the entire component, and an area of air passage is decreased by as much as the increased area of the entire components which reduces a cooling area of a radiator.

However, according to the present disclosure, the base component 100 and the image component 200 may be manufactured to be integrally coupled to each other by double injection as described above to eliminate clearance between the base component 100 and the image component 200. Accordingly, a whistle noise is prevented from occurring. Moreover, the present disclosure may prevent deterioration of aerodynamic force and prevent reduction in the cooling area of the radiator. The image component 200 coupled to the vent component 110 of the base component 100 according to the present disclosure may include a cross-coupling component 210 coupled to the rear surface of the base component 100 along a lower edge of the air passage 111, that partially protrudes toward the air passage 111, and may be exposed toward the front of the radiator grill to form an image of two different colors and a longitudinal-coupling component 220 that connects the cross-coupling component 210 in the vertical direction while being coupled to the rear surface of the base component 100 and provides an increased strength of the coupling force between the base component 100 and the cross-coupling component 210.

Further, the image component 200 coupled to the blocked component 120 of the base component 100 may include a plane component 230 that is connected to the cross-coupling component 210 to strengthen the coupling force of the cross-coupling component 210 and overlaps and is coupled together in a patched form (e.g., coupled together in an overlapping form or pattern.) to the rear surface of the base component 100. A stepped seating surface 112 may be formed in a stair-like shape on a lower edge of the air passage 111, and the front end part of the cross-coupling component 210 may be more stably seated in and coupled to the seating surface 112 to overlap the seating surface. Accordingly, the base component 100 and the cress-coupling component 210 may overlap and be coupled together by the seating surface 112, to provide an improved coupling force therebetween.

A lower portion of the cross-coupling component 210, having about 30% to 40% thickness of the cross-sectional thickness of the cross-coupling part 210 may be more stably seated in and coupled to the seating surface 112 of a lower edge of the air passage 111 to overlap the seating surface. An upper portion of the cross-coupling component 210, having the remaining thickness of about 60% to 70% protrudes toward the air passage 111 and may be exposed toward the front of the radiator grill to form an image of two different colors. Reference numeral 211 denotes a front surface 211 of the cross-coupling component 210 which form an image of two different colors as exposed toward the front of the radiator gill through the air passage 111.

When the cross-coupling component 210 at the cross-sectional thickness of about 30% or less is coupled to the seating surface 112, an insufficient coupling force may be provided and the durability therebetween may decrease. When the cross-coupling component 210 at the cross-sectional thickness of about 40% or more is coupled to the seating surface 112, an image of two different colors may not be smoothly formed as an exposure amount of the front surface 211 of the cross-coupling component 210 exposed through the air passage 111 may be reduced. Therefore, the cross-coupling component 210 at the cross-sectional thickness of about 30% to 40% may be more stably seated in and coupled to the seating surface 112 to overlap the seating surface.

Additionally, when the s-sectional thickness of the cross-coupling component 210 protruding toward the air passage 111 is about 60% or less, an exposure amount of the front surface 211 of the cross-coupling component 210 exposed through the air passage 111 may be reduced and thus an image of two different colors may not be smoothly formed. When the cross-sectional thickness of the cross-coupling component 210 protruding toward the air passage 111 is about 70% or greater and coupled to the seating surface 112, a sufficient coupling force may not be secured due to an insufficient cross-sectional thickness of the cross-coupling component 210, and thus the upper surface of the cross-coupling component 210, having about 60% to 70% thickness thereof may protrude toward the air passage 111 to be exposed toward the front of a radiator grill.

Figure 5:
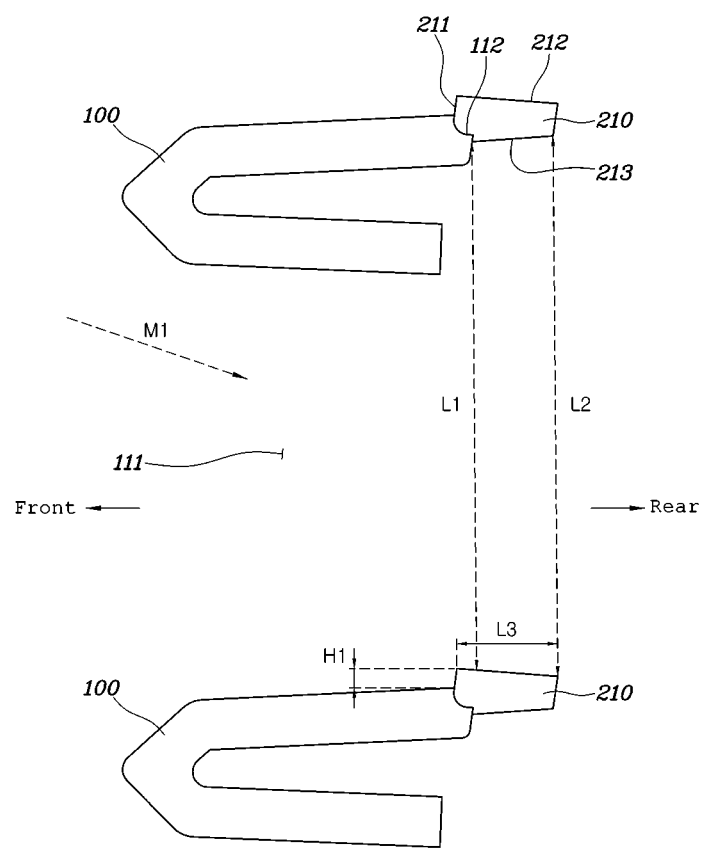
Figure 6:
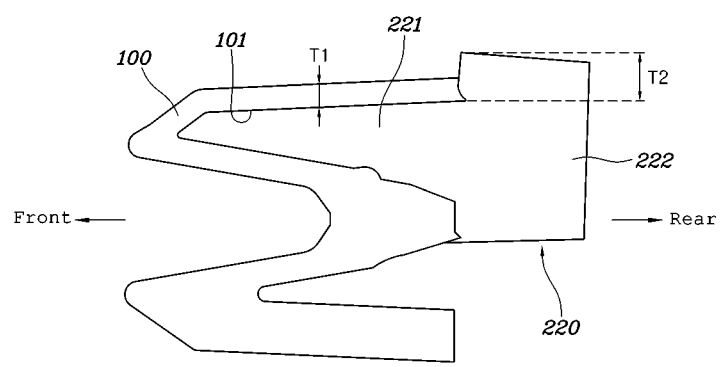

An upper surface 212 of the cross-coupling component 210 may be formed to include the front side thereof disposed at a higher position than the rear side thereof and may be formed as a sloped surface gradually descending from the front to the rear. A lower surface 213 of the cross-coupling component 210 may be formed to have the front side thereof disposed at a lower position than the rear side thereof and may be formed as a sloped surface gradually ascending from the front to the rear. At the two cross-coupling parts 210 vertically disposed to each other as illustrated in FIG. 5, when each of the upper surface 212 and the lower surface 213 of the cross-coupling component 210 are formed as a sloped surface, the length L2 between the two cross-coupling parts 210 at the rear side may be greater than the length L1 between the two cross-coupling parts 210 at the front side. Accordingly, an area of the rear side of the air passage 111 may be enlarged and a cooling area of a radiator in contact with the air maybe further secured resulting in an improved cooling performance.

Further, when the radiator grill is viewed from the front of the vehicle, the viewpoint is in a downward inclined direction as indicated by the arrow M1 illustrated in FIG. 5 due to the height difference between the human eyes and the radiator grill. Therefore, when the area of the air passage 111 is further enlarged due to each of the upper surface 212 and the lower surface 213 of the clues-coupling component 210 formed as a sloped surface, the interior space of the engine compartment may be exposed to the exterior through the further widened air passage 111, and aesthetics may be degraded.

The present disclosure may include a structure in which the external exposure amount of the engine compartment through the air passage 111 may remain the same as that of the conventional art or be reduced even when the size of the air passage 111 is widened to secure the cooling area of the radiator, thereby preventing aesthetic degradation of a vehicle. In other words, the present disclosure having the anteroposterior length L3 of the upper surface 212 of the clubs-coupling component 210 may be a length of about 5 to 7 times with respect to the clubs-sectional height H1 of the clubs-coupling component 210 protruding toward the air passage 111.

When the anteroposterior length L3 of the upper surface 212 of the cross-coupling component 210 is formed to be about 5 times or less with respect to the clubs-sectional height H1 of the cross-coupling component 210 protruding toward the air passage 111, the external exposure amount of the engine compartment through the air passage 111 becomes much greater than that of the conventional art resulting aesthetic degradation of the exterior. When the length L3 is formed to be about 7 times or greater, an amount of the cross-coupling component 210 invading the engine compartment increases and the engine compartment narrows. Therefore, the anteroposterior length L3 of the upper surface 212 of the cross-coupling component 210 may be about 5 to 7 times with respect to the cross-sectional height H1 of the cross-coupling component 210 protruding toward the air passage 111.

Moreover, the longitudinal-coupling component 220 of the image component 200 may include a protrusion component 221 that is coupled to fill an insertion aperture 101 formed in the base component 100 and a body component 222 that is formed to have a size capable of blocking the exterior side of the insertion aperture 101 and is patched and coupled to the rear surface of the base component 100. A s-sectional thickness T1 of the region where the base component 100 and the protrusion component 221 are coupled may have a thickness of about 40% to 60% with respect to a clubs-sectional thickness T2 of the body component 222 protruding to the exterior side of the protrusion component 221 from the region where the protrusion component 221 and the body component 222 are coupled together.

Conventionally, the clubs-sectional thickness T1 of the region where the base component 100 and the protrusion component 221 are coupled was formed thick enough to be approximately equal to the cross-sectional thickness T2. However, when forming a thickness of the base component 100, a concavely grooved depression occurs on a surface of the base component 100 and durability of the base component 100 is deteriorated. During double injection, a depression occurs on a surface of the base component 100 due to a hindrance to a second resin flow caused by a temperature difference between a first injection product firstly injected and a mold of a core component for the second injection. In particular, when a molding pressure is increased to prevent the formation of the depression, over-force may be applied to the mold and when resin fluidity is improved by adding a gate the added gate causes a number of exterior flow lines, thereby degrading the exterior aesthesis.

Accordingly, in the present disclosure, the cross-sectional thickness T1 of the hasp component 100 on a region coupled to the protrusion component 221 may have a thickness of about 40% to 60% with respect to the cross-sectional thickness T2 of the body component 222 protruding to the exterior side of the protrusion component 221 from the region where the protrusion component 221 and the body component 222 are coupled together to prevent a depression from forming on a surface of the base component 100 due to the double injection.

When the cross-sectional thickness T1 of the base component 100 on a region coupled to the protrusion component 221 is a thickness of about 40% or less with respect to the clubs sectional thickness T2 of the body component 222 protruding to the exterior side of the protrusion component 221, the cross-sectional thickness of the base component 100 is reduced and a durability problem of the base component 100 occurs. When the cross-sectional thickness T1 is formed in about 60% or greater thickness, the rate of depression formation may increase. Therefore, in present disclosure, the cross-sectional thickness T1 of the base component 100 on a region coupled to the protrusion component 221 may have a thickness of about 40% to 60% with respect to the cross-sectional thickness T2 of the body component 222 protruding to the exterior side of the protrusion component.

Figure 7:
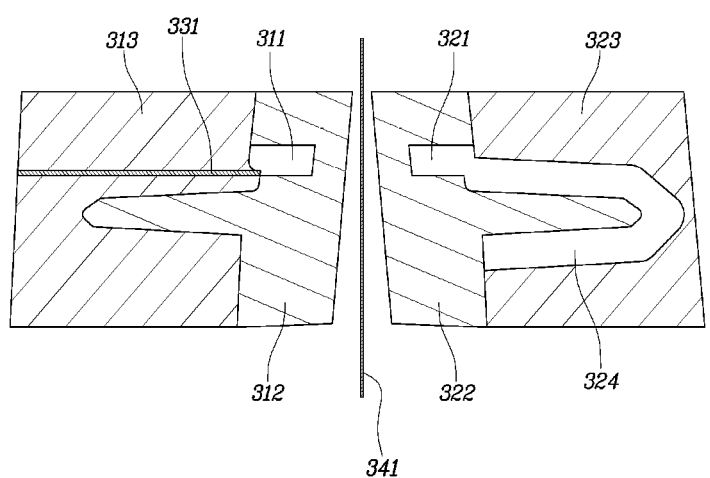
Figure 8:
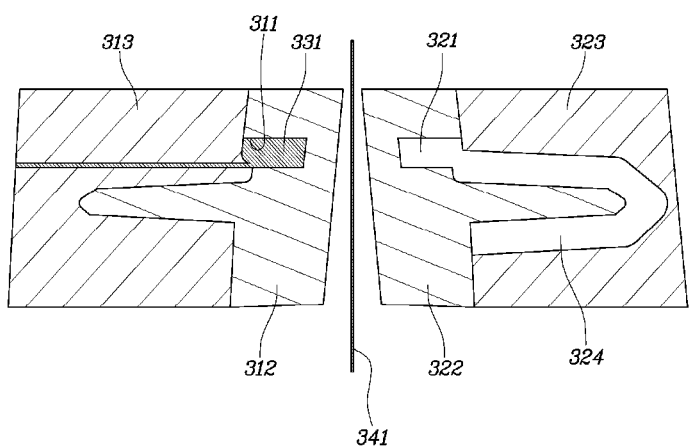

FIGS. 7 to 14 illustrate an exemplary process of manufacturing a vehicle radiator gill having two different colors using double injection of a spin form method. In other words, when a first mold 313 is assembled to a first core 312 having a first cavity 311 formed therein and a second mold 323 is assembled together to a second core 322 having a second cavity 321 formed therein as illustrated in FIG. 7, a first resin 313 (e.g., mixed resin of PC and ABS) of red color (e.g., second color) may be initially injected into the first cavity 311 as illustrated in FIG. 8.

The first core 312 and the second core 322 may be formed in the same shape and may be disposed laterally with respect to a rotation shaft 341 therebetween while being integrally coupled to the rotation shaft 341. The first mold 313 and the second mold 323 may be formed in different shapes from each other. A third cavity 324 may be formed in the second mold 323 and a second resin to be described later may be injected into the third cavity 324. The first resin 331 may be finally exposed through the air passage 111 and becomes the image component 200 that forms two different colors.

Figure 9:
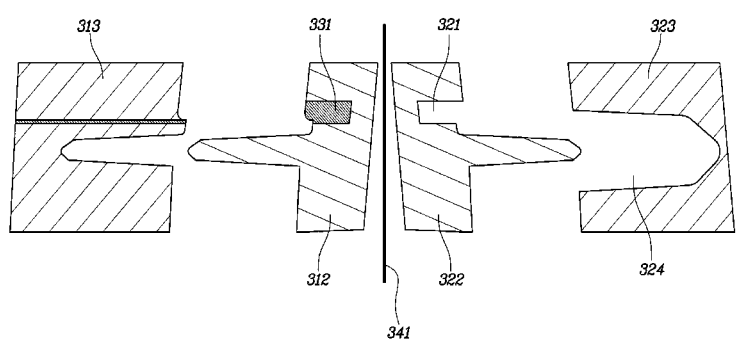
Figure 10:
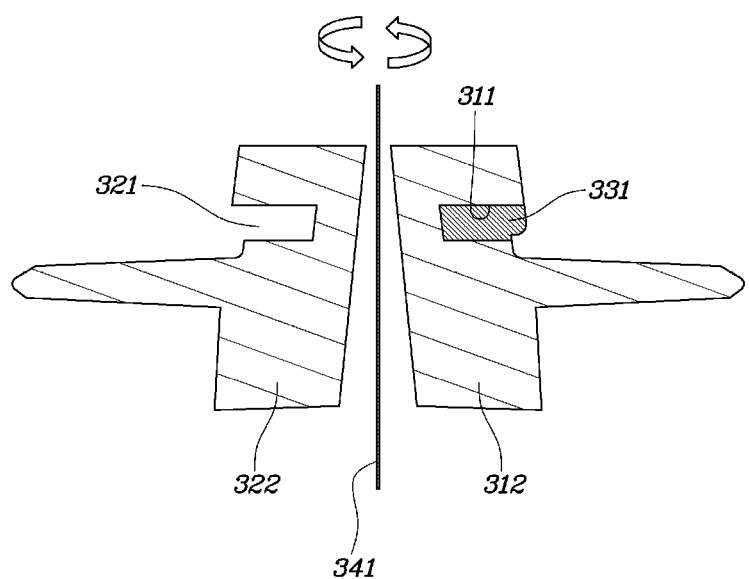
Figure 11:
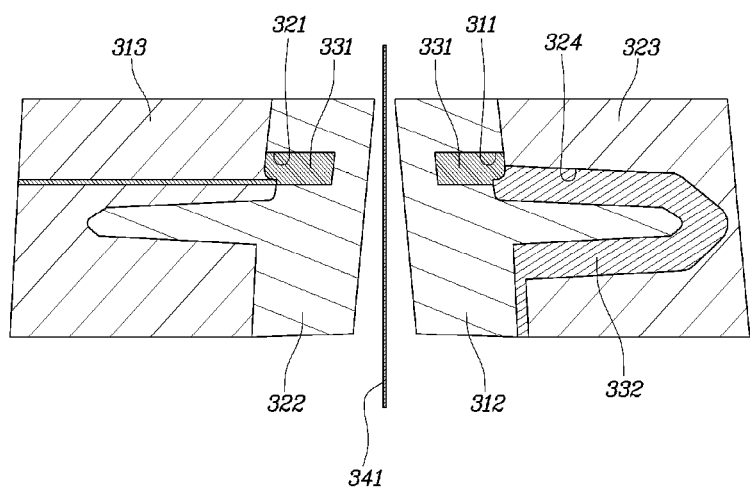

After the first resin 331 is injected into the first cavity 311 and a predetermined time passes, the first and second molds 313, 323 may be separated as illustrated in FIG. 9. Further, positions of the first and second cores 312, 322 may be exchanged by a rotation of the rotation shaft 341 as illustrated in FIG. 10. Then the first mold 313 may be assembled to the second core 322 and the second mold 323 may be assembled to the first core 312 as illustrated in FIG. 11. After completion of the assembling, the first resin 331 of red color (e.g., second color) may be injected into the second cavity 321 and the second resin 332 of black color (e.g., first color) may be injected into the third cavity 324.

Figure 12:
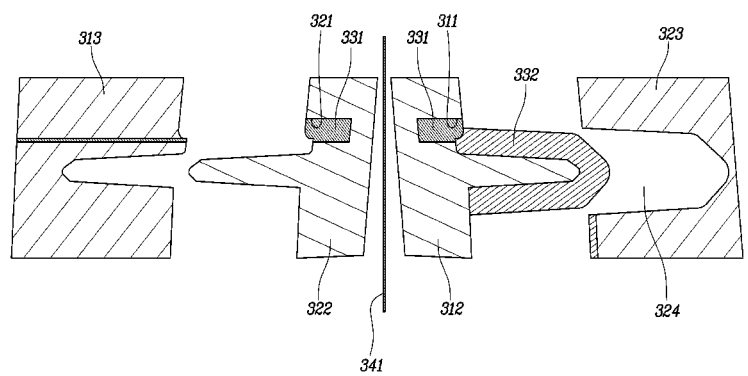

The second resin 332 finally becomes the base component 100 that has the air passage 111 formed therethrough and forms the exterior of the radiator grill. When the second resin 332 is injected into the third cavity 324, the second resin 332 may be coupled together and integrally formed with the first resin 331 which has been injected into the first cavity 311. After the second resin 332 is injected into the third cavity 324 and a predetermined time passes, the first and second molds 313, 323 may be separated again as illustrated in FIG. 12 and a product in which the first resin 331 and the second resin 332 are combined may be withdrawn from the first core 312 as illustrated in FIGS. 13A and 13B.

Figure 14:
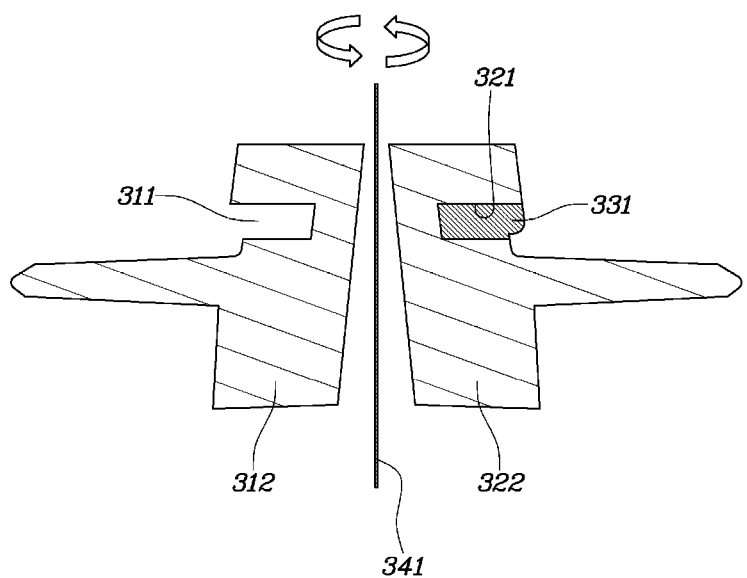

The combined product of the first resin 331 and the second resin 332, withdrawn from the first core 312 may correspond to a vehicle radiator grill having two different colors according to the present disclosure. The second resin 332 may correspond to the base component 100 that has the air passage 111 formed therethrough and may form the exterior of the radiator grill. The first resin 331 may correspond to the image component 200 that is exposed through the air passage 111 to form two different colors. The combined product of the first resin 331 and the second resin 332 that is, a vehicle radiator grill manufactured by integrally combining the base component 100 and the image component 200 by double injection and thus having two different colors may be withdrawn from the first core 312. The rotation shaft 341 may be configured to rotate to change the positions of the first and second cores 312, 322 as illustrated in FIG. 14. Thereafter, the processes of FIGS. 7 to 14 are repeated to manufacture the vehicle radiator grill having two different colors.

As described above, an exemplary embodiment of the present disclosure relates to a vehicle radiator grill that is manufactured by integrally combining plastic resins (e.g., first resin and second resin) of different colors using double injection and thus has two different colors. Therefore, the present disclosure may improve the productivity through reduction in weight, cost and the number of processes, compared with a conventional method using painting or plating and a conventional structure using a screw or a hook. Additionally, the present disclosure may be environmentally friendly characteristics, by forming two different colors without painting or plating.

Further, the present disclosure may increase the size of the air passage formed through the radiator grill while forming two different colors to increase a radiator cooling area. Moreover, in the present disclosure, the external exposure amount of the engine compartment through the air passage may remain the same as that of the conventional art or be reduced even though the size of the air passage is widened to secure a cooling area of a radiator. Accordingly, the external exposure of the engine compartment through the air passage may be maximally prevented, to minimize exterior aesthetic degradation of a vehicle.

A particular exemplary embodiment of the present disclosure has been illustrated and described, but various changes and modifications would be obvious to a person ordinarily skilled in the art without departing from the technical idea of the present disclosure, provided by the following claims.

What is claimed is:

1. A vehicle radiator gill having two different colors, comprising:
    a base component having a first color and forms an exterior of a radiator grill while providing a vent component having a plurality of air passages formed therethrough and blocked parts disposed at both sides of the vent component; and
    an image component having a second color different from the color of the base component,
    wherein the first color of the base component is formed by a first injection and the second color of the image component is formed by a second injection,
    wherein the image component is integrally formed with the base component by the first injection and the second injection such that the second color is exposed toward the front of the radiator grill through an air passage to form an image of two colors of the radiator grill, and
    wherein the image component coupled to the vent component of the base component further comprises:
        a cross-coupling component which is coupled to a rear surface of the base component along a lower edge of the air passage, partially protrudes toward the air passage, and is exposed toward the front of the radiator grill to form an image of two different colors; and
        a longitudinal-coupling component which connects the cross-coupling component in the vertical direction while being coupled to the rear surface of the base component and strengthens the coupling force between the base component and the cross-coupling component.

2. The vehicle radiator grill of claim 1, wherein a stepped seating surface is formed in a stair-like shape on a lower edge of the air passage, and a front end portion of the cross-coupling component is seated in and coupled to the seating surface to overlap the seating surface.

3. The vehicle radiator grill of claim 2, wherein a lower portion of the cross-coupling component, having about 30% to 40% thickness of the cross-sectional thickness of the cross-coupling component is seated in and coupled to the seating surface of a lower edge of the air passage to overlap the seating surface, and an upper portion of the cross-coupling component, having the remaining thickness of about 60% to 70% of the cross-sectional thickness of the cross-coupling component protrudes toward the air passage to be exposed toward the front of the radiator grill, to form an image of two different colors.

4. The vehicle radiator grill of claim 3, wherein an upper surface of the cross-coupling component is formed having the front side disposed at a higher position than the rear side and is formed as a sloped surface gradually descending from the front to the rear, and a lower surface of the cross-coupling component is formed having the front side disposed at a lower position than the rear side and is formed as a sloped surface gradually ascending from the front to the rear.

5. The vehicle radiator grill of claim 4, wherein an anteroposterior length of the upper surface of the cross-coupling component is a length of about 5 to 7 times the cross-sectional height of the cross-coupling component protruding toward the air passage.

6. The vehicle radiator grill of claim 5, wherein the longitudinal-coupling component comprises:
    a protrusion component which is coupled to fill an insertion aperture formed in the base component; and
    a body component which is formed to have a size blocking the exterior side of the insertion aperture and is patched together and coupled to the rear surface of the base component, wherein the cross-sectional thickness of the base component on a region coupled to the protrusion component is a thickness of about 40% to 60% with respect to the cross-sectional thickness of the body component protruding to the exterior side of the protrusion component from the region where the protrusion component and the body component are coupled together.

7. The vehicle radiator grill of claim 6, wherein the image component coupled to a blocked portion of the base component includes a plane component that is connected to the cross-coupling component to strengthen the coupling force of the cross-coupling component and is overlappingly coupled, in a patched form, to the rear surface of the base component.

* * * * *